United States Patent
Gage

[11] 3,903,616
[45] Sept. 9, 1975

[54] MOLECULE MODEL CONSTRUCTION KIT

[76] Inventor: Portia L. Gage, 203 Willow Rd., Menlo Park, Calif. 94025

[22] Filed: Nov. 7, 1974

[21] Appl. No.: 521,736

[52] U.S. Cl. .................. 35/18 A; 46/25; 273/160
[51] Int. Cl.² ................................ G09B 23/26
[58] Field of Search .......... 35/18 A, 20; 46/25, 30; 273/160

[56] References Cited
UNITED STATES PATENTS

| | | | |
|---|---|---|---|
| 2,691,242 | 10/1954 | Young | 46/30 X |
| 3,296,714 | 1/1967 | Klotz | 35/18 A X |
| 3,372,936 | 3/1968 | Sanson | 273/160 |
| 3,594,924 | 7/1971 | Baker | 35/18 A |
| 3,802,097 | 4/1974 | Gluck | 35/18 A |
| 3,854,223 | 12/1974 | Dingman | 35/18 A |

*Primary Examiner*—Harland S. Skogquist

[57] ABSTRACT

A molecule model construction kit includes six types of members, with each type representing the sugar, phosphate, thymine, adenine, guanine, and cytosine submolecules of the DNA molecule. The members are provided with coupling devices in the form of interlocking notches which represent the bonds between the sugar and phosphate submolecules, between the bases and the sugar submolecules, and between the bases. The coupling notches are asymmetrical and each notch corresponding to one-half of a bond is engageable with only one other notch corresponding to the other half of the same bond and in only one orientation with respect thereto. Therefore, the notches are formed so that the model can have only the structural configuration of a DNA molecule and each notch coupling performs functions analagous to the corresponding bonds in the DNA molecule, but not to functions of noncorresponding bonds. Furthermore, the notches have an orientation which results in a helical twist in the sugar-phosphate chains, with the proper ratio between adjacent chains, between adjacent loops of the same chain, and the diameter of the helix.

6 Claims, 10 Drawing Figures

PATENTED SEP 9 1975
3,903,616
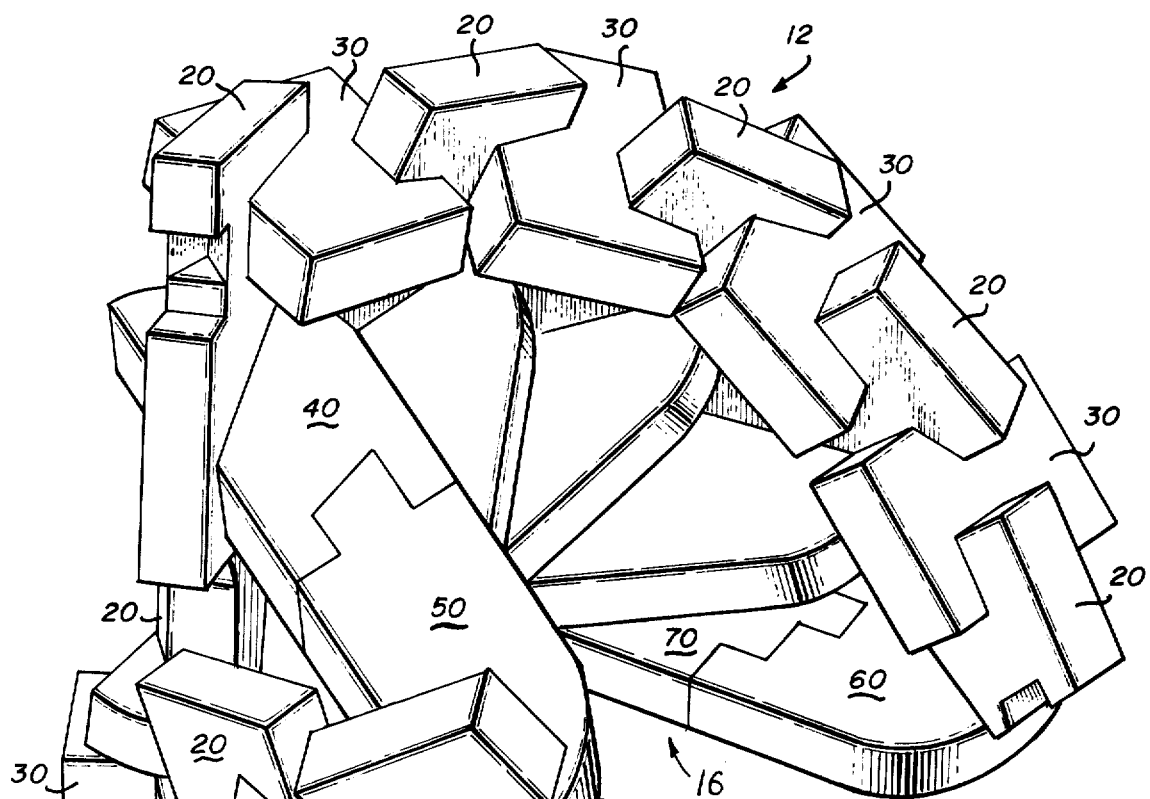
Fig_1
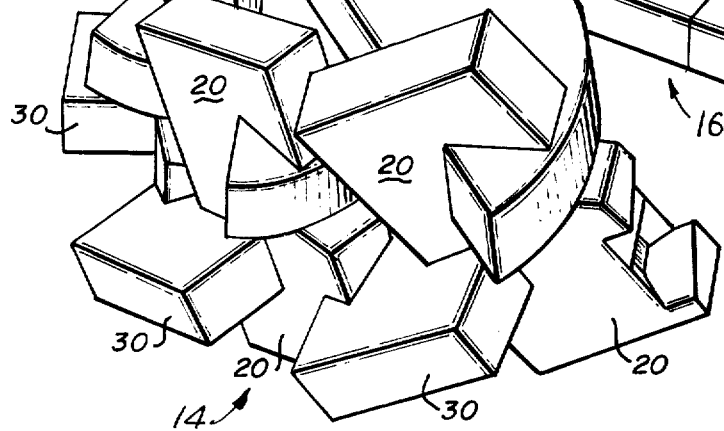
Fig_2
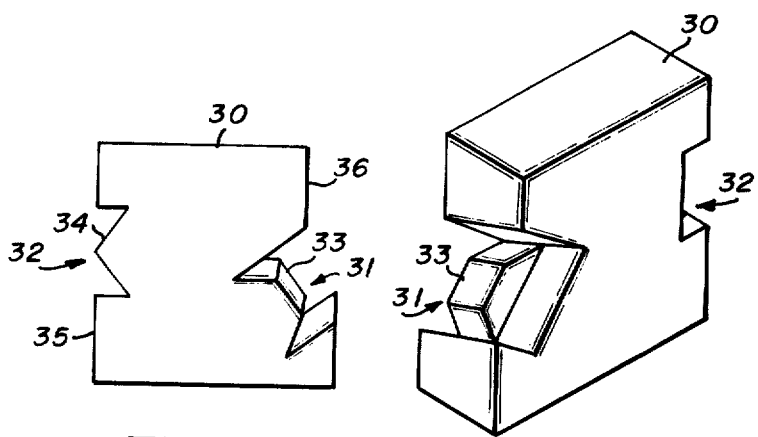
Fig_3
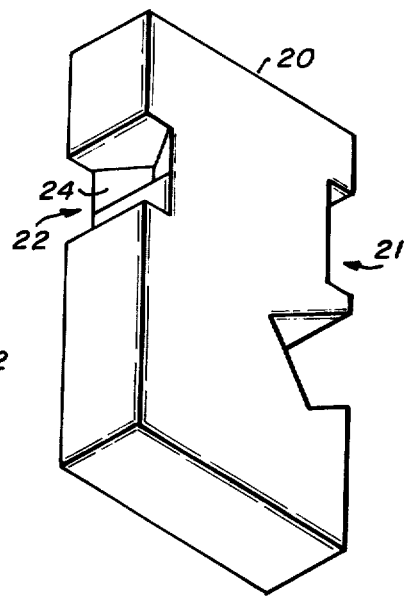
Fig_4

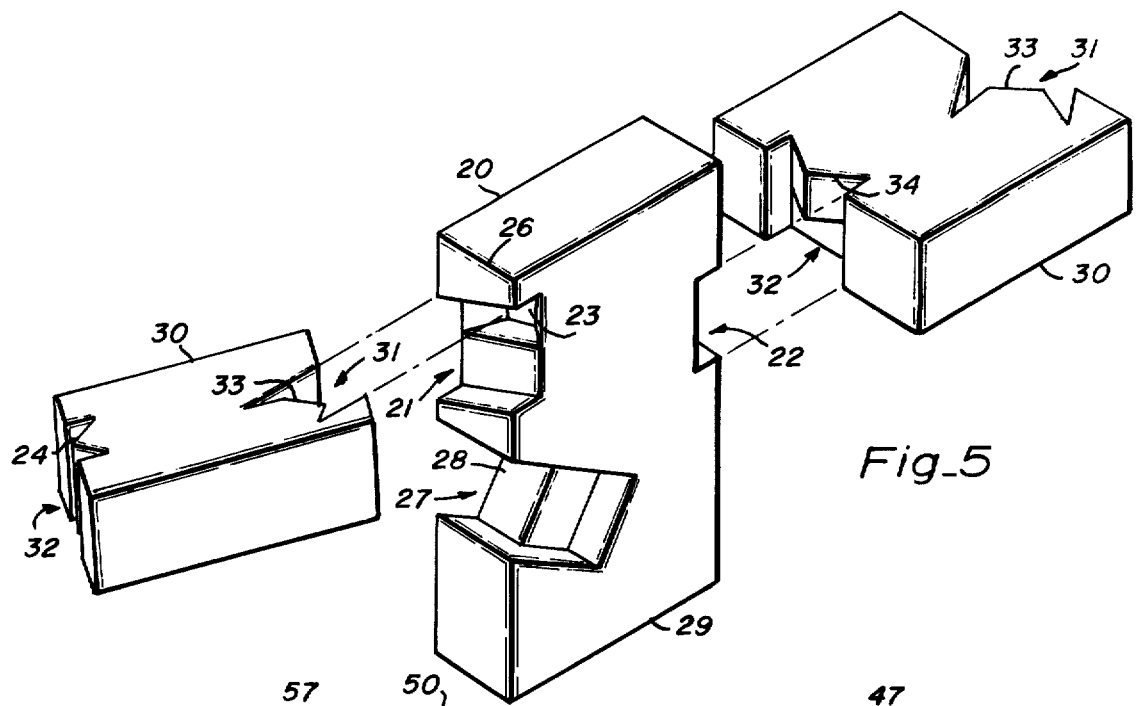
Fig_5
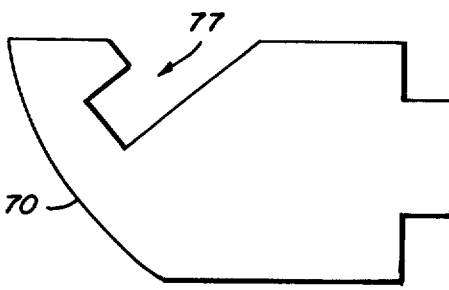
Fig_6
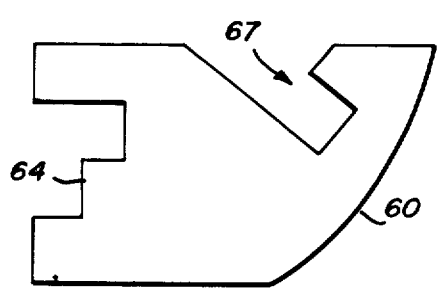
Fig_7
Fig_8
Fig_9
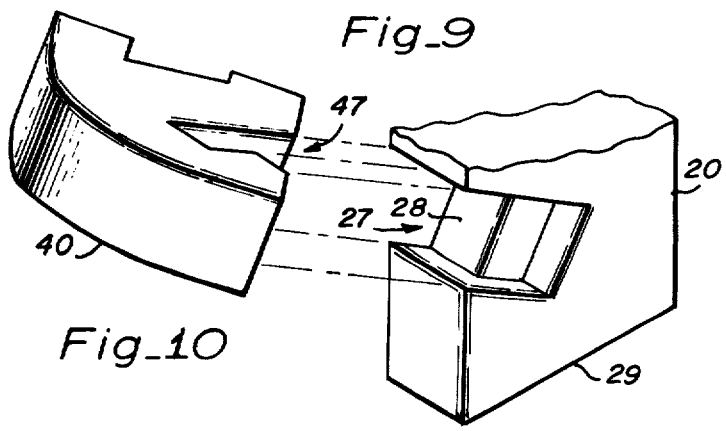
Fig_10

MOLECULE MODEL CONSTRUCTION KIT

BACKGROUND OF THE INVENTION

1. Field of the Invention

This invention relates generally to molecule model construction kits, and more particularly to a kit for constructing a relatively complex chemical molecule model, such as a doublestranded deoxyribonucleic acid (DNA) molecule having a helical twist, which is self supporting.

Prior Art

A number of different types of model construction kits are available for demonstrating the structure of chemical molecules and their replication during mitosis, such as the DNA molecule. The majority of these kits require a supporting frame or central supporting rod for not only supporting the individual pieces of the kit, but to maintain a desired orientation therebetween. Furthermore, many of the available kits require the user to be fairly knowledgeable of the configuration of the molecule being simulated, since the individual pieces of such kits can be attached together incorrectly. It can be readily appreciated that if the user of the construction kit is fairly knowledgeable of the configuration of the molecule being simulated, the construction of the molecule model provides the user with little, if any, benefit. Furthermore, if the molecule model is constructed of such a kit for the benefit of others, such as by a teacher for the benefit of students, the actual benefit of interconnecting individual pieces corresponding to submolecules will not be realized by the observers.

One type of kit which is available for demonstrating the construction of the DNA molecule and its replication during mitosis employs a supporting rod and two stretchable rubber strands that represent the alternating pentose and phosphate units and join the ends of the bases to form a double helix. Another kit which is available has flexible plastic strips representing the sugar-phosphate chains. These strips are attached to inflexible plastic slats representing the bases and the base pieces are snapped onto a central supporting rod. In both of the above mentioned kits, the directional property of the sugar-phosphate chains is not recognizable. Also, the base pairs are centered on a diameter of the helix, rather than on a chord of the helix as occurs in an actual DNA molecule.

U.S. Pat. No. 3,296,714 discloses a molecule model construction kit which employs plastic tubes of different lengths and colors to represent the DNA molecule components. The plastic tubes are connected in a DNA ladder configuration by metal prongs and placed in a supporting stand to provide the ladder with a helical twist. It can be appreciated that the sugarphosphate chain of this model cannot simulate the directional properties of the sugar-phosphate chain in an actual DNA molecule. Furthermore, the base pairs extend across a diameter of the helix.

U.S. Pat. No. 3,594,924 discloses a molecule model construction kit in which the DNA molecule components are represented by plastic polyhedrons which are connected together by elements similar to those employed in pop-it beads. This model is supported and provided with a helical twist by a central rod. The model disclosed in this patent also does not represent the directional property of the sugar-phosphate chains and the base pairs thereof are located on a diameter of the helix. Similar problems are found in the model disclosed in U.S. Pat. No. 3,802,097. Each of the above described models is not selfsupporting and does not depict the exact orientation of the components of an actual DNA molecule.

In the above described models, the base pairs occupy or extend across a diameter of the helix, rather than across a chord thereof as occurs in an actual DNA molecule. This discrepancy causes the model to have other dissimilarities to an actual DNA molecule. In such an actual molecule, the distance between two adjacent sugar-phosphate chains is approximately one-half the distance between the next two adjacent sugarphosphate chains. That is, the ratio of the helix diameter to the distance between adjacent loops of the same chain is 2 to 3.4 and the ratio of the helix diameter to the distance between adjacent sugar-phosphate chains is approximately 2 to 2.3 and 2 to 1.1, respectively. This relative positioning of the sugar-phosphate chains and their spacing in comparison to the helix diameter has not been achieved in prior known molecule construction models. The reason for this deficiency is that the base components of prior known models extended across the diameter of the helix. This position of the base pairs was necessitated by the lack of self-supportive qualities in such prior known models.

SUMMARY OF THE INVENTION

Accordingly, it is an object of the present invention to provide a molecule model construction kit in which the individual pieces thereof can be assembled in only one orientation with respect to one another to form an analog of the molecule being simulated.

Another object of the present invention is to provide a molecule model construction kit which, when assembled, provides a better analog of the position of the components of the actual molecule.

A further object of the present invention is to provide a molecule model construction kit in which one of the components thereof is asymmetrical such that when a chain is formed it will have a directional property.

Another object of the present invention is to provide a molecule model construction kit for a DNA molecule in which the directional property of the two sugar-phosphate chains forming a double helix is opposite directions.

Still another object of the present invention is to provide a molecule model construction kit for a DNA molecule in which the pieces representing the base pairs occupy or extend across a chord of the helix, rather than a diameter thereof.

A further object of the present invention is to provide a molecule model construction kit in which the assembled model forms a double helical shape without the aid of any additional supporting structures.

These and other objects of the present invention are attained by a plurality of groups of rigid members, with each group representing one type of submolecule. Each member is provided with at least one notch which is engageable with only one other notch of a piece representing a different component of the molecule. The notches are asymmetrical such that they will fit together to provide only one orientation between the joined pieces.

A feature of the present invention resides in the location and orientation of the notches in each piece such that the resulting model provides a better analog of the shape of an actual molecule, and a double helical shape can be provided with each helical chain having a directional property.

Another feature of the present invention resides in the dimensional qualities of the notches and the rigidity of the pieces such that the resulting model is self-supporting.

These and other objects, features and advantages of the present invention, however, will be more fully realized and understood from the following detailed description, when taken in conjunction with the accompanying drawings, wherein;

BRIEF DESCRIPTION OF THE DRAWINGS

FIG. 1 is a view in perspective of a portion of a model of a DNA molecule which is constructed in accordance with the principles of the present invention.

FIG. 2 is a plan view of a piece representing a phosphate submolecule.

FIG. 3 is a view in perspective of the piece illustrated in FIG. 2.

FIG. 4 is a view in perspective of a piece representing a sugar molecule.

FIG. 5 is an exploded view in perspective of a piece representing the sugar submolecule and two pieces each representing a phosphate submolecule.

FIG. 6 is a plan view of a piece representing the adenine submolecule.

FIG. 7 is a plan view of a piece representing the thymine submolecule.

FIG. 8 is a plan view of a piece representing the guanine submolecule.

FIG. 9 is a plan view of a piece representing the cytosine submolecule.

FIG. 10 is an exploded view in perspective of a portion of a sugar peice and a base piece.

Like reference numerals throughout the various views of the drawings are intended to designate the same elements.

DETAILED DESCRIPTION OF THE PREFERRED EMBODIMENTS

With reference to FIG. 1, there is shown a portion of a model of a DNA Molecule which includes a first sugar-phosphate chain 12 and a second sugar-phosphate chain 14 having directional properties which are opposite to one another. The two chains 12 and 14 are joined together by a plurality of base elements or members 16. The axis of the helix in FIG. 1 is rotated away from a vertical line in the drawing. More particularly, the top of the axis of the helix is rotated toward the viewer and to the right from such a vertical line.

Each sugar-phosphate chain is formed of two types of members or pieces; namely, member 20 representing a sugar submolecule and member 30 representing a phosphate submolecule. The base pairs 16 are formed by a member 40 representing the thymine submolecule and an element 50 representing the adenine submolecule or a member 60 representing the cytosine submolecule and a member 70 representing the guanine submolecule.

The phosphate member 30 is illustrated more clearly in FIGS. 2 and 3. As shown therein, the member 30 includes a pair of notches 31 and 32 in opposite edges thereof. A hexagonal projection 33 extends across half the length of the notch 31 and a triangular projection 34 extends across half the length of the notch 32. Edges of the notch 32 are perpendicular to an edge 35 of the member 30, whereas edges of the notch 31 are at an angle of 144° with respect to an edge 36 of the member 30.

The sugar member 20 is illustrated in FIGS. 4, 5 and 10. As shown in FIGS. 4 and 5, the member 20 is provided with notches 21 and 22 in opposite edges thereof. The notch 21 is provided with a hexagonal indentation 23 extending across half the width thereof and the notch 22 is provided with a triangular indentation 24 extending across half the width thereof. As shown more clearly in FIG. 5, notch 31 of the member 30 is conformably shaped to and disposed for mating engagement with the notch 21 of the member 20 when the member 30 is rotated approximately 19° from an orthogonal relationship with member 20. Accordingly, an edge 25 of the notch 21 is disposed at an angle of approximately 19° with respect to an edge 26 of the member 20. Also, notch 32 is conformably shaped to and disposed for mating engagement with the notch 22 when the member 30 is orthogonal to member 20.

Because of the angular relationship of the notch 31 with respect to the edge 36 of the member 30, when two sugar members 20 are linked by a phosphate member 30, they are at an angle of 144° with respect to one another in a plane perpendicular to the axis of the helix. Also, as will be explained below, each sugar member 20 in a chain dips with respect to a line parallel to the helix axis at an angle of 29°. This orientation of the sugar members 20 and the differential between the displacement of the notches 21 and 22 from the top of the member 20 (as viewed in FIG. 5) forms the helical shape of the sugar-phosphate chain.

The base members 40, 50, 60 and 70 are illustrated in FIGS. 6–9. These base members are provided with notches 47, 57, 67, and 77, respectively, which are identical in shape and orientation with respect to the corresponding member. Considering the notch 47, and edge 42 thereof is at an angle of 141° with respect to an edge 43 of the member 40. Each of these notches 47, 57, 67, 77 are disposed for engaging a notch 27 in an edge of members 20, as shown in FIG. 10. Each of the notches 27 is provided with a projection 28 having a width equal to the width of the notches 47, 57, 67 and 77. Accordingly, the base members can have only one orientation with respect to the member 20 when one of the notches 47, 57, 67, or 77 is in mating engagement with the notch 27.

Notch 27 is at an angle of 29° with respect to an edge 29 of the member 20. The base members lie in a plane which is perpendicular to the helix axis and, therefore, the members 20 dip with respect to a line parallel to the helix axis at an angle of 29°. Accordingly, in the chain 12 illustrated in FIG. 1, the notch 22 will be higher than the notch 21 with respect to a plane perpendicular to the helix axis. This differential and the 144° relationship of two adjacent sugar members 20 form the helical shape of the sugar-phosphate chain.

Because of the 141° angular relationship of the notches 47, 57, 67 and 77, two adjacent sugar-phosphate chains, such as the chains 12 and 14, will cross a plane perpendicular to the helix axis at points which are spaced 78° from one another. Accordingly, as shown in FIG. 1, the base pairs extend across a chord of the helix, rather than a diameter thereof and the proper ratio between adjacent turns of the helical chains is provided. That is, the distance from the chain 14 to the chain 12 is approximately one-half the distance from the chain 12 to the chain 14 in an upward direction as viewed in FIG. 1 if the chain 14 were completed and extended in a counterclockwise direction to extend over the chain 12.

Member 40 is also provided with a notch 44 and member 50 is provided with a projection 54 which is conformably shaped thereto. Also, member 60 is provided with a notch 64 and member 70 with a projection 74 which is conformably shaped thereto. When the projection 54 is received in the notch 44, one type of base pair is formed and when the projection 74 is received in the notch 64, another type of base pair is formed. It will be noted that the projection 54 cannot be received for mating engagement in the notch 64 and that the projection 74 cannot be received for mating engagement in the notch 44. Accordingly, only the members 40 and 50 can be joined together and only the members 60 and 70 can be joined together to form base pairs. Furthermore, the base members can not be turned over and joined to its corresponding mating member. As a result, the sugar-phosphate chains have directional properties as can be appreciated from FIG. 1 in which the chain 12 appears to have a direction opposite to the chain 14.

Preferably, the individual pieces are formed of a plastic material and the various notches and projections are dimensioned to provide a relatively close, friction fit between the pieces. Accordingly, a molecule model constructed in accordance with the principles of the present invention is selfsupporting. Even if the chains of the molecule are pulled apart at the intersection of the base pairs, the resulting helical chains are self-supporting.

A molecule model constructed in accordance with the principles of the present invention also has the advantage that the individual pieces thereof can only be assembled in only one manner, with the proper orientation therebetween. Accordingly, one need not be knowledgeable of the molecule being simulated in order to construct the model of the present invention.

The invention claimed is:

1. A kit for constructing a molecule model having a helical twist therein, comprising a first plurality of rigid members representing a first submolecule, a second plurality or rigid members representing a second submolecule, each of said first and second members having first and second asymmetrical notches in respective edges thereof, the first and second asymmetrical notches of each of said first plurality of members being conformably shaped to the first and second asymmetrical notches, respectively, of each of said second plurality of members, such that each of said first members is keyed to each of said second members when corresponding notches thereof are in mating engagement to provide a self-supporting formation and to maintain a fixed orientation therebetween which simulates the helical orientation of the corresponding submolecules in the simulated molecule.

2. The kit of claim 1, wherein each of said first plurality of members represents a sugar submolecule and each of said second plurality of members represents a phosphate submolecule.

3. The kit of claim 1, wherein said model represents a double-stranded molecule, and further comprising a third plurality of rigid members representing base pairs and each having a pair of asymmetrical notches, each of said first members having a third asymmetrical notch conformably shaped to and disposed for mating engagement with a notch of each of said third members.

4. The kit of claim 3, wherein the notches of said third members have an orientation, such that each of said third members extends across a chord, rather than a diameter, of the helix.

5. The kit of claim 3, wherein each of said third members includes a pair of pieces, a first and second of said pieces having conformably shaped mating surfaces which are nonconformable to any other surfaces of said pieces and said members, and a third and fourth of said pieces having conformably shaped mating surfaces which are nonconformable to any other surfaces of said pieces and said members.

6. The kit of claim 1, wherein one of said notches has an orientation such that adjacent ones of said first members in a chain are at an angle of approximately 144° with respect to one another.

* * * * *